(12) United States Patent
Tokuda et al.

(10) Patent No.: US 6,536,475 B2
(45) Date of Patent: Mar. 25, 2003

(54) FLUID SELECTOR VALVE

(75) Inventors: Tetsuro Tokuda, Tsukuba-gun (JP);
Hiroaki Suzuki, Tsukuba-gun (JP);
Makoto Tomita, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 64 days.

(21) Appl. No.: 09/921,558

(22) Filed: Aug. 6, 2001

(65) Prior Publication Data
US 2002/0023682 A1 Feb. 28, 2002

(30) Foreign Application Priority Data
Aug. 28, 2000 (JP) .................................. 2000-257309

(51) Int. Cl.[7] ............................................. F16K 11/044
(52) U.S. Cl. .................................................. 137/625.5
(58) Field of Search ........................ 137/625.48, 625.49, 137/625.5

(56) References Cited
U.S. PATENT DOCUMENTS

| | | | | |
|---|---|---|---|---|
| 1,442,782 A | * | 1/1923 | Braun .................... | 137/625.5 |
| 2,911,995 A | * | 11/1959 | Preising ................ | 137/625.48 |
| 2,914,035 A | * | 11/1959 | Banker .................. | 137/625.48 |
| 3,134,395 A | * | 5/1964 | Glasgow ................ | 137/625.5 |
| 4,078,579 A | * | 3/1978 | Bucko, Sr. ............ | 137/625.48 |
| 4,852,612 A | * | 8/1989 | Bucko, Sr. ............ | 137/625.5 |
| 6,209,582 B1 | * | 4/2001 | Ashley et al. ......... | 137/625.5 |

* cited by examiner

*Primary Examiner*—John Fox
(74) *Attorney, Agent, or Firm*—Oblon, Spivak, McClelland, Maier & Neustadt, P.C.

(57) ABSTRACT

A three-port fluid selector valve is formed to have a large flow coefficient while making a structure of the valve compact. This three-port fluid selector valve allows fluid which has flowed from an inlet port 41 into a valve chamber 12 in a valve casing 1 to flow out of two outlet ports 42 and 43. Valve seats 13 and 31 communicating with the respective outlet ports are provided to opposite walls of the valve chamber 12 facing each other and a poppet-type valve body 5 for being selectively seated on the valve seats to connect the inlet port to one of the outlet ports and to close the other of the outlet ports is disposed in the valve chamber. The valve seats are formed in recessed shapes in the valve chamber 12 and provided to inner bottom portions of valve seat holes 17 and 18 having depths in which at least a half of a thickness of the valve body 5 at a periphery of the valve body 5 is embedded and suppresses reduction of the flow coefficient.

6 Claims, 4 Drawing Sheets

FLUID SELECTOR VALVE

TECHNICAL FIELD

The present invention relates to a three-port fluid selector valve and particularly to a fluid selector valve having a large flow coefficient while a structure of the valve is compact.

PRIOR ART

As a three-port fluid selector valve, there is a conventionally and generally known valve for selectively allowing fluid such as liquid which has flowed from an inlet port into a valve chamber to flow out of two outlet ports on opposite sides. In this type of fluid selector valve, there are the following problems when valve seats communicating with the two outlet ports are respectively provided to a wall of the valve chamber into which the fluid flows from the inlet port and a poppet-type valve body disposed in the valve chamber is selectively seated on the valve seats to connect the inlet port to one of the outlet ports and to close the other of the outlet ports.

In other words, in the fluid selector valve, cross-sectional areas of a flow path extending from the inlet port to the valve chamber and the valve chamber itself are increased in a possible range so as to increase a flow rate without upsizing an outside shape. However, as a result of various experiments, arbitral upsizing of the flow path does not effectively increase the flow rate and may produce a contrary effect in such a manner that a stagnating portion or a portion where a flow path section is changed sharply to disturb a flow is formed. Therefore, it was found to be possible to sufficiently enhance the flow coefficient sufficiently by minimizing sharpness of throttles in portions where sharp throttles are formed locally and specifically in a portion where a sharp throttle is formed by projection of a portion of the valve body at a back portion of the valve body into the flow path, sharp throttle portions formed due to provision of the valve seats, and the like.

DISCLOSURE OF THE INVENTION

The present invention has been accomplished based on the above-described findings and it is basically a technical object of the invention to form the above-described three-port fluid selector valve with a large flow coefficient while making a structure of the valve compact.

It is another technical object of the invention to minimize sharpness of a sharp throttle due to projection of a portion of a valve body at a back portion of the valve body and throttles at valve seats to enhance the flow coefficient of the fluid selector valve based on the above findings.

It is another technical object of the invention to provide a fluid selector valve having the enhanced flow coefficient and a structure which can be manufactured and assembled easily.

To achieve the above objects, a fluid selector valve of the invention is a three-port fluid selector valve for selectively allowing fluid which has flowed from an inlet port into a valve chamber in a valve casing to flow out of two outlet ports on opposite sides of the inlet port, valve seats communicating with the respective outlet ports being respectively provided in positions of a wall of the valve chamber facing each other and a poppet-type valve body for connecting the inlet port to one of the outlet ports while closing the other of the outlet ports by being selectively seated on the two valve seats being disposed in the valve chamber, wherein the respective valve seats are respectively provided to inner bottom portions of valve seat holes formed on the valve chamber wall and a depth of each the valve seat hole is equal to or greater than a half of a thickness of an outer peripheral portion of the valve body.

In the fluid selector valve of the invention, it is more appropriate that a part of the wall of the valve chamber and a part of a hole peripheral wall of each of the two valve seat holes are formed of a continuous partial cylindrical face on a side opposite to the inlet port and that a width s of a valve seat step which is a difference between an inside diameter D of each the valve seat hole and an inside diameter d of each the valve seat is $s \leq 0.03d+3$[mm]. It is more appropriate that elbow-shaped bends of the flow paths extending from the two valve seats to communicate with the respective ports are formed and that a radius R of curvature of each the bend on an outer peripheral side is R=0.5 d to 1 d.

In a preferable embodiment of the invention, the valve casing is formed by joining an end block to a main body, the main body includes a flow path extending from the inlet port to communicate with one of the outlet ports through one of the valve seats, a rod passing for sliding through the main body and having at a tip end of the rod a valve body so as to open and close the valve seats with the valve body, and driving means for driving the rod to seat the valve body on both the valve seats, and the end block has the valve seat communicating with the other of the outlet ports and a flow path extending from the valve seat to the outlet port.

The fluid selector valve of the invention having the above structure selectively allows fluid which has flowed from the inlet port into the valve chamber in the valve casing to flow out of the two outlet ports on opposite sides of the inlet port. Because the valve seats provided in the flow paths extending to the outlet ports are provided at the inner bottom portions of the valve seat holes and each of the valve seat holes has the depth which is equal to or greater than the half of the thickness of the valve body, the back portion of the valve body seated on the valve seat does not project by a large distance into the flow path of fluid flowing through the other valve seat, and the sharp throttle is not formed in the flow path at the back portion. Therefore, it is possible to minimize sharpness of the throttle due to the valve body and to enhance the flow coefficient of the fluid selector valve.

In other words, if the valve seats are respectively provided on inner surfaces of opposite walls facing each other in the valve chamber so as to simplify the structure, the back portion of the valve body itself seated on the valve seat projects into the valve chamber to sharply reduce the flow path of the fluid flowing from the inlet port through the open valve seat. However, such a problem is solved by the above-described structure.

In the fluid selector valve, it is effective to form the inner wall face of the valve chamber and the peripheral wall faces of the two valve seat holes of the continuous partial cylindrical face at a portion of the valve chamber wall facing the inlet port so as to facilitate processing of the valve chamber in the valve casing and to reduce the change of the flow path section. It is effective to minimize the width s of the valve seat step in the above-described range so as to suppress reduction of the flow coefficient due to throttling of the flow paths at the valve seats. Furthermore, by setting the radius R of curvature on the outer peripheral side of each of the elbow-shaped bends of the flow path extending from the two valve seats to communicate with the respective ports in a value in the above-described range, it is possible to further suppress reduction of the flow coefficient.

With the above structure, the fluid selector valve can be formed to have the large flow coefficient while the structure of the valve is made compact.

If the valve casing in the fluid selector valve is formed by joining the end block to the main body and the other valve seat facing one valve seat provided to the main body is provided to the end block, it is possible to easily carry out processing of the valve chamber and the valve seat in the main body and assembly of the valve body and the like through a hole of the main body closed with the end block.

DETAILED DESCRIPTION

Figure 1:
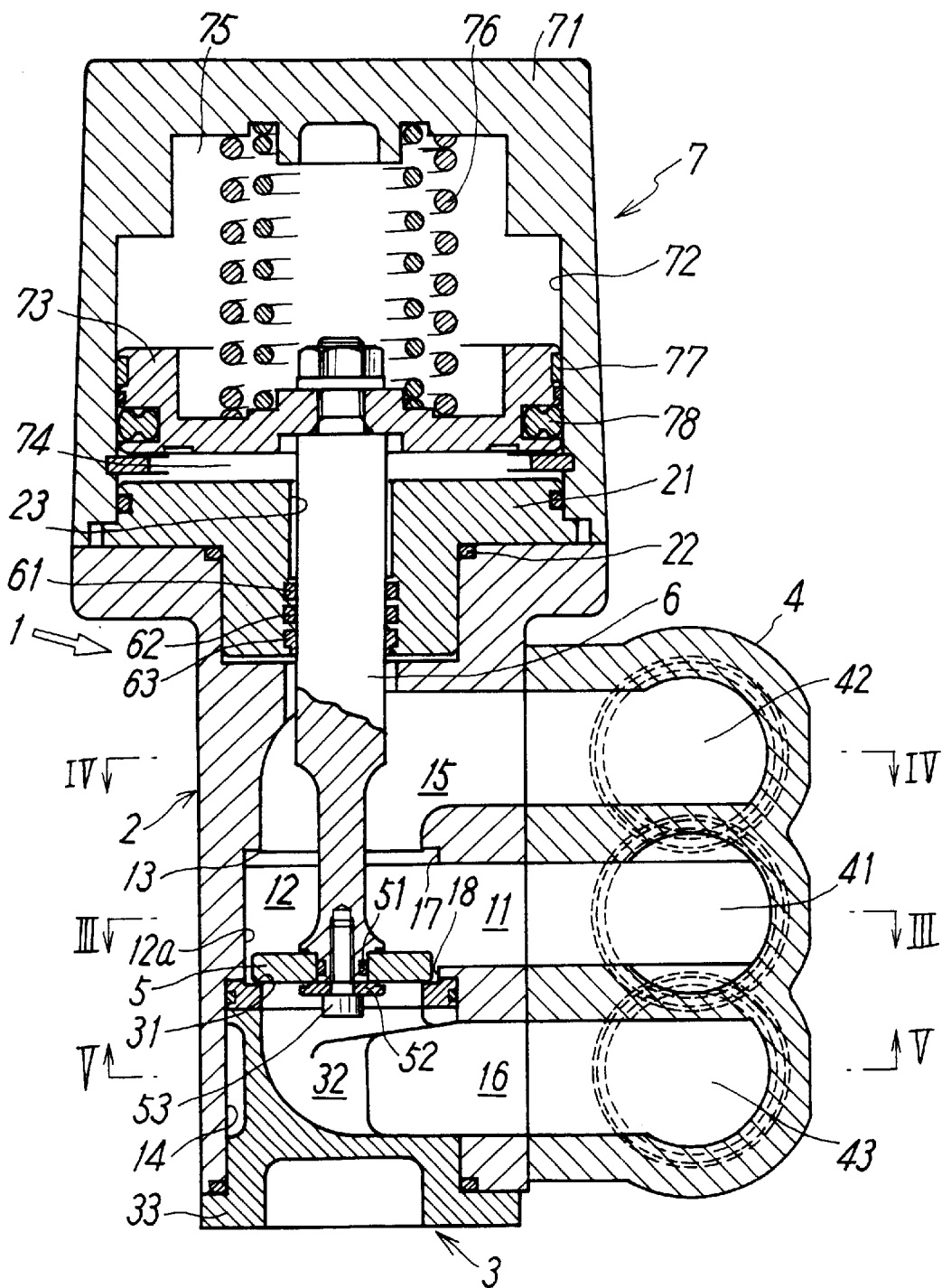
FIG. 1 is a sectional view showing an embodiment of a fluid selector valve according to the present invention.
Figure 2:
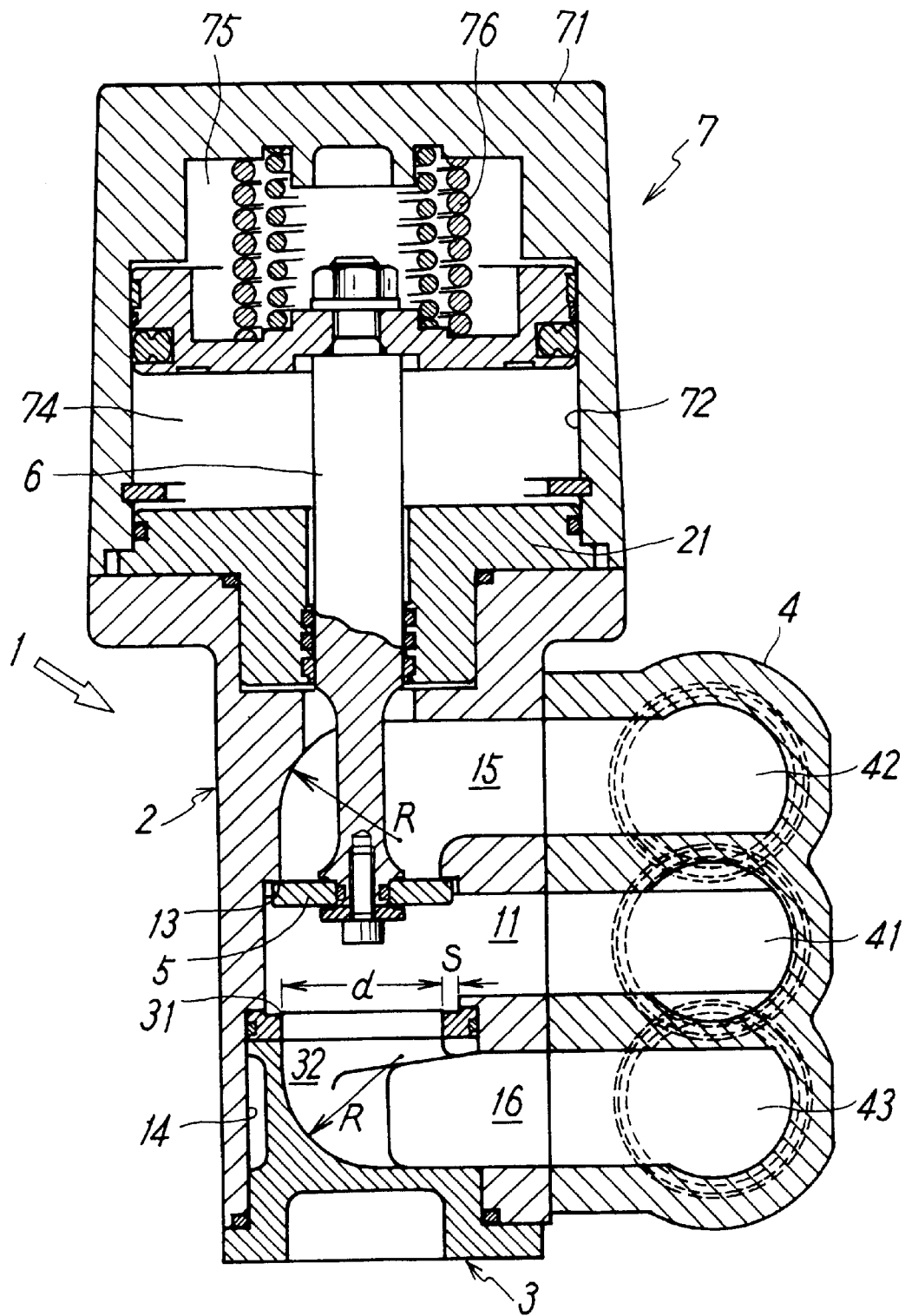
FIG. 2 is a sectional view showing the other selected state of a valve body in the above embodiment.

FIGS. 1 to 5 show an embodiment of a fluid selector valve according to the present invention.

This fluid selector valve is a three-port fluid selector valve for selectively allowing fluid such as liquid which has flowed from an inlet port into a valve casing to flow out of two outlet ports, includes as its main components a valve casing 1 formed by joining an end block 3 to a main body 2 and ports communicating with respective flow paths of the valve casing 1, and includes a sub-plate 4 connected to the valve casing 1, a rod 6 passing through the main body 2 and mounted at a tip end of the rod 6 with a poppet-type valve body 5, and driving means 7 for driving the rod 6.

The valve casing 1 includes a valve chamber 12 into which fluid flows from the inlet port 41 of the sub-plate 4 through a flow path 11 and includes a pair of valve seats 13 and 31 on opposite walls facing each other of the valve chamber. Downstream from the valve seats 13 and 31, flow paths 15 and 16 communicating with the two outlet ports 42 and 43 on opposite sides of the inlet port 41 in the sub-plate 4 are provided respectively. Therefore, the sub-plate 4 is joined to the main body 2 with the inlet port 41 communicating with the flow path 11 of the main body 2 and the outlet ports 42 and 43 respectively communicating with the flow paths 15 and 16 of the main body 2.

Figure 3:
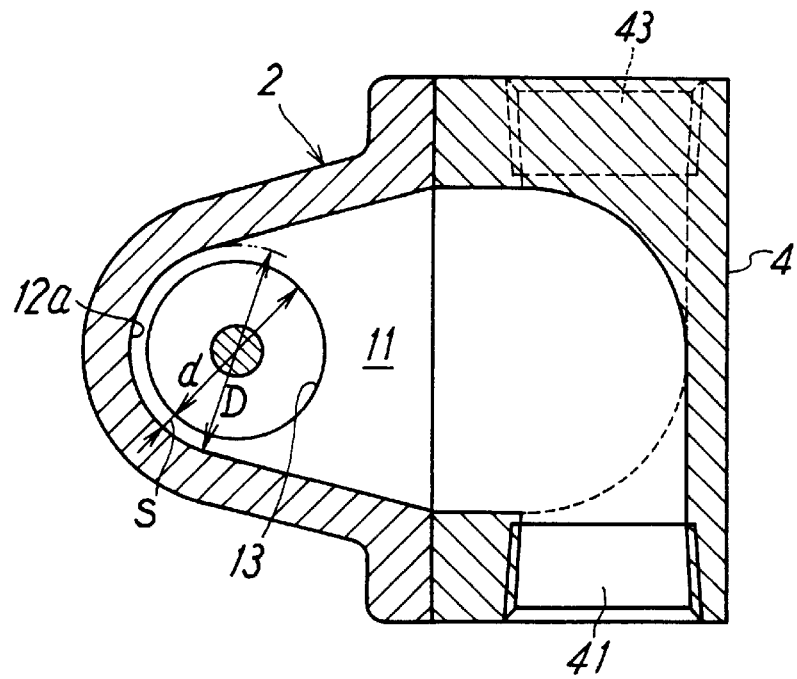
FIG. 3 is a sectional view taken in a position III—III in FIG. 1.
Figure 4:
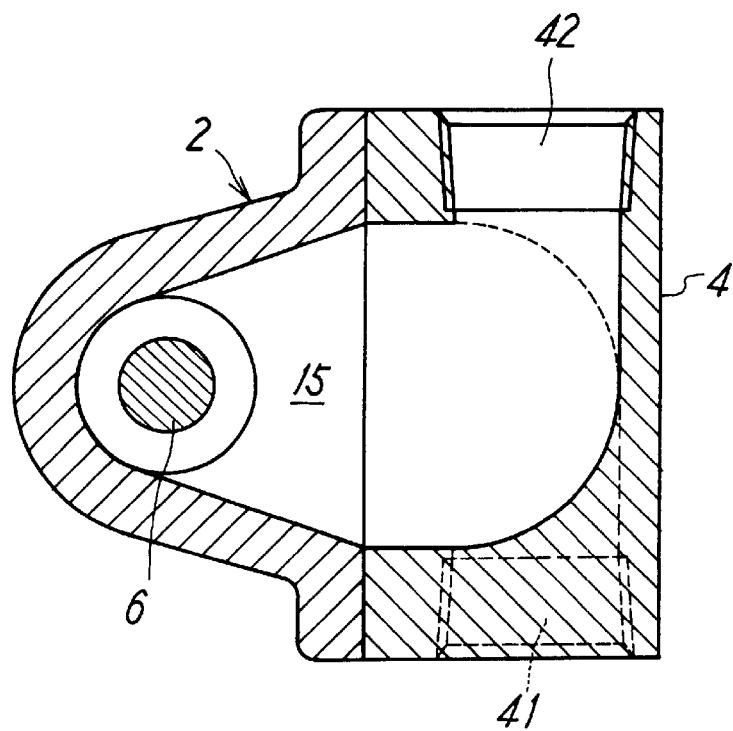
FIG. 4 is a sectional view taken in a position IV—IV in FIG. 1.
Figure 5:
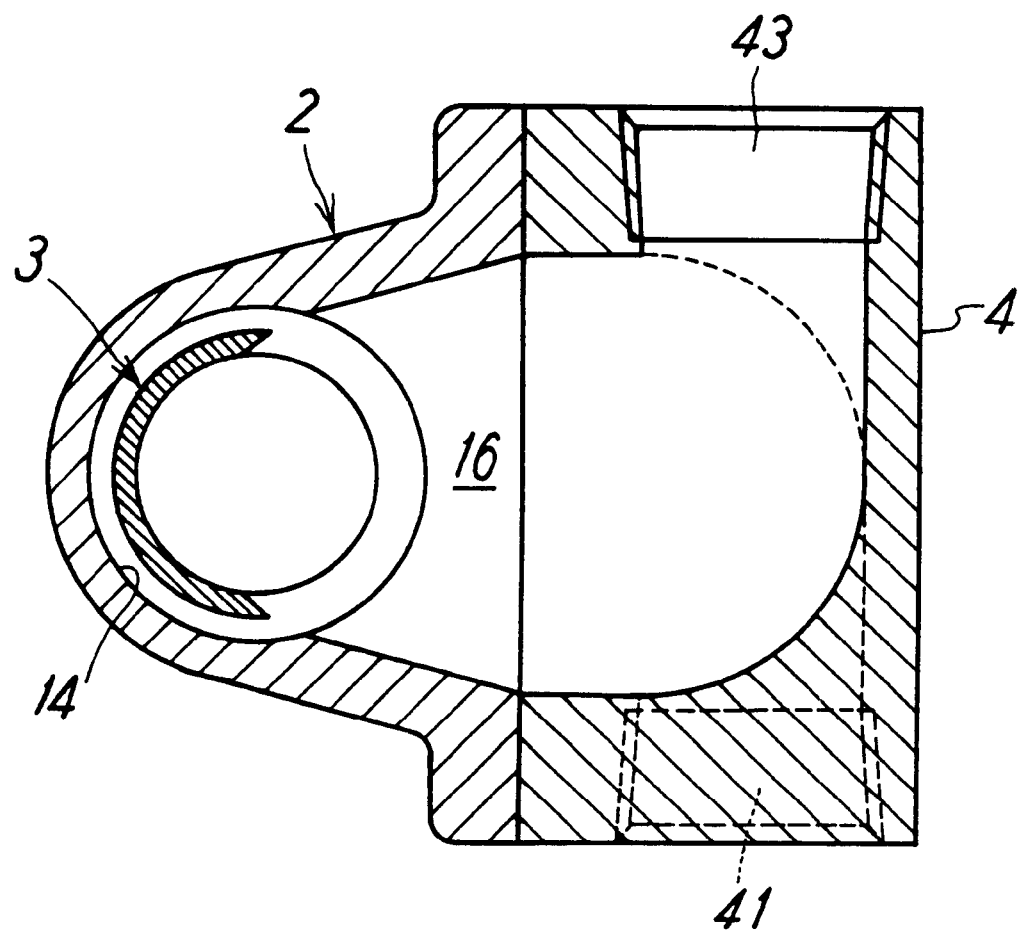
FIG. 5 is a sectional view taken in a position V—V in FIG. 1.

The inlet port 41 and the outlet ports 42 and 43 on opposite sides of the inlet port 41 in the sub-plate 4 open in directions opposite to each other as can be seen from FIGS. 3 to 5.

The main body 2 includes a junction hole 14 in a position coaxial with the rod 6 retaining the valve body 5 and is joined to the end block 3 by fitting the end block 3 in the junction hole 14 and fixing a flange portion 33 to the main body. Of the valve seats 13 and 31, the one valve seat 13 is integrally or detachably provided to the main body 2 and the other valve seat 31 is mounted to the main body 2 with the end block 3.

The end block 3 is provided with a flow path 32 extending from the valve seat 31 to communicate with the port 43 through the flow path 16 in the main body 2. The flow path 32 and the flow path 16 are formed to have a substantially uniform flow path cross-sectional area including the flow path in the valve seat 31. There is no harm in forming the valve seat 31 separately from the end block 3 as shown in the drawings or integrally with the end block 3.

Both the valve seats 13 and 31 are provided at inner bottom portions of valve seat holes 17 and 18 formed in a wall of the valve chamber 12. Depths of the valve seat holes 17 and 18 are at least equal to or greater than a half of a thickness of an outer peripheral portion of the valve body 5. Thus, in selectively allowing fluid which has flowed from the inlet port 41 into the valve chamber 12 in the main body 2 to flow out of the two outlet ports 42 and 43, a back portion of the valve body 5 seated on any of the valve seats 13 and 31 at the inner bottom portions of the valve seat holes 17 and 18 does not project by a large distance into the flow path of fluid flowing through the open valve seat 31 or 13. Therefore, a sharp throttle due to the valve body is not formed in the flow path, the throttle in the flow path by the valve body 5 is made gentle, and a flow coefficient of the fluid selector valve can be enhanced.

It is more effective that the valve seat holes 17 and 18 have such depths that an entire thickness of the valve body 5 can be fitted with the holes in not forming the throttle in the flow path. However, these depths result in necessity of upsizing of an outside shape of the valve casing 1 to provide the valve seat holes 17 and 18. Therefore, it is advantageous to maximize the depths of the valve seat holes as long as an influence of the throttle in the flow path due to the valve body 5 on the flow coefficient does not become large. By various experiments, it is known that an advantageous range of the depths of the valve seat holes 17 and 18 is about a half of the thickness of the outer periphery of the valve body 5 to a dimension equal to the thickness. It is not preferable that the depths of the valve seat holes 17 and 18 are greater than the thickness of the valve body 5 because a change of the flow path section becomes large.

In the valve chamber 12 in the valve body 2, an inner wall face 12a of the valve chamber wall facing the inlet port 41 is formed of a continuous partial cylindrical face with a part of hole peripheral wall faces of the two valve seat holes 17 and 18. The junction hole 14 for the end block 3 provided to the main body 2 is a cylindrical face with a larger diameter than at least the partial cylindrical face.

Therefore, not only reduction of the change in the flow path section from the valve chamber 12 to the valve seats 13 and 31 but also easy processing of the inner wall face 12a of the valve chamber 12 and the valve seat 13 in the main body block 2 and assembly of the valve body 5 through the junction hole 14 of the valve body 2 are possible.

It is not preferable to form a recessed portion in the inner wall face 12a of the valve chamber 12 to upsize the valve chamber 12 even if there is room in a wall thickness of the main body 2, because the flow paths from the valve chamber 12 are throttled by a large amount at the valve seats 13 and 31.

It is necessary to reduce the change in the flow path section of fluid flowing from the valve seat holes 17 and 18 through the valve seats 13 and 31 by minimizing a width s (see FIG. 3) of a valve seat step which is a difference between an inside diameter D of each of the valve seat holes 17 and 18 and an inside diameter d of each of the valve seats 13 and 31. On the other hand, it is necessary to allow enough room for the width s of the valve seat step in view of a width required for at least seating and sealing of the valve body 5 and manufacturing and assembly tolerances of the valve body 5. If the width and tolerances are taken into consideration, in a general-purpose fluid selector valve, the width s basically needs to be 3 mm, desirably 2 mm, and empirically 0.03d [mm], though the width of the step s needs to be changed according to the inside diameter d of the valve seat when the diameter d increases.

As a result, the width s may be in the following range.

$$s \leq 0.03d+3 \text{ [mm]}$$

By minimizing the width s of the valve seat step in such a range, it is possible to suppress reduction of the flow coefficient due to throttling of the flow paths at the valve seats 13 and 31.

The flow paths extending from the two valve seats 13 and 31 to respectively communicate with the outlet ports 42 and 43 form elbow-shaped bends. A radius R of curvature on an outer peripheral side of each of the bends is preferably $$R = 0.5d \text{ to } 1d$$

so as to suppress reduction of the flow coefficient.

The valve body 5 is mounted to a tip end of the rod 6 by fitting the disc-shaped poppet-type valve body 5 with the tip end of the rod 6 through a sealing member 51 and screwing a bolt 53 over the tip end of the rod through a holder 52. The rod 6 passes through the main body 2 and a support plate 21 mounted to the main body 2 through an O-ring 22 and extends outside from the valve casing 1. To the main body 2, a pneumatically operated cylinder as the driving means 7 is attached such that the support plate 21 is covered with the cylinder. The rod 6 is inserted through a hole 23 provided to the support plate 21 in airtight and watertight states through an air seal 61, a liquid seal 62, and a scraper 63.

The pneumatically operated cylinder is mounted to the main body 2 such that the support plate 21 is covered with the cylinder and includes a cover 71 having inside thereof a cylinder bore 72 and a piston 73 fixed to a base end of the rod 6 and fitted in the cylinder bore 72. The piston 73 partitions an inside of the cylinder bore 72 into a pilot chamber 74 on the main body 2 side and a back chamber 75 on an opposite side. The pilot chamber 74 communicates with a port (not shown) through which pilot compressed air is supplied and discharged and the back chamber 75 is open into the atmosphere through a breathing port (not shown). In the back chamber 75, a return spring 76 for pushing the piston 73 toward the pilot chamber 74 when the compressed air is discharged from the pilot chamber 74 is housed. Around the piston 3, a wear ring 77 and piston packing 78 in sliding contact with an inner face of the cylinder bore 72 are provided.

The driving means 7 is not limited to the above-described pneumatically operated driving cylinder.

The fluid selector valve having the above structure is formed to have the large flow coefficient while having a compact structure and selectively allows the fluid (liquid such as water and oil) which has flowed from the inlet port 41 into the valve chamber in the valve casing 1 to flow out of two outlet ports 42 and 43 by the valve body 5 driven by the driving means 7. Because the valve seats 13 and 31 provided in the flow paths are provided at the inner bottom portions of the valve seat holes 17 and 18 and each of the valve seat holes has the depth which is at least equal to or greater than the half of the thickness of the periphery of the valve body 5, the back portion of the valve body 5 seated on the valve seat 31 as shown in FIG. 1 does not project by the large distance into the flow path of fluid passing through the other valve seat 13 to form the sharp throttle in the flow path, for example.

Because the portion of the inner wall face 12a of the valve chamber wall facing the inlet port 41 is formed of the continuous partial cylindrical face with the peripheral wall faces of the two valve seat holes 17 and 18, not only easy processing of the valve chamber 12 in the valve casing 1 but also reduction of the change in the flow path section is possible. Moreover, because the width s of the valve seat step is minimized in the above-described range, throttling of the flow paths at the valve seats 13 and 31 is also suppressed in this respect. Furthermore, by setting the radius R of curvature of each of the elbow-shaped bends in the flow paths extending from the two valve seats 13 and 31 to communicate with the respective outlet ports 42 and 43 at a value in the above-described range, it is possible to further suppress reduction of the flow coefficient.

Because the valve casing 1 is formed by joining the end block 3 to the main body 2 and the other valve seat 31 facing the one valve seat 13 provided to the main body 2 is provided to the end block 3, it is possible to easily carry out processing of the valve chamber 12 and the valve seat in the main body 2 and assembly of the valve body 5 through the junction hole 14 of the main body 2 closed with the end block 3.

According to the fluid selector valve of the invention described above in detail, it is possible to obtain the fluid selector valve having the large flow coefficient by minimizing sharpness of the sharp throttle due to projection of the portion of the valve body at the back portion of the valve body and the throttle at each the valve seat while making the structure of the selector valve compact in the three-port fluid selector valve and it is possible to facilitate manufacturing and assembly of the fluid selector valve.

What is claimed is:

1. A three-port fluid selector valve for selectively allowing fluid which has flowed from an inlet port into a valve chamber in a valve casing to flow out of two outlet ports on opposite sides of said inlet port, valve seats communicating with said respective outlet ports being respectively provided in positions of a wall of said valve chamber facing each other and a poppet-type valve body for connecting said inlet port to one of said outlet ports while closing the other of said outlet ports by being selectively seated on said two valve seats being disposed in said valve chamber, wherein said respective valve seats are respectively provided at inner bottom portions of respective valve seat holes formed on said valve chamber wall and a depth of each said valve seat hole is equal to or greater than a half of a thickness of an outer peripheral portion of said valve body.

2. A fluid selector valve according to claim 1, wherein a part of said wall of said valve chamber and a part of a hole peripheral wall of each of said two valve seat holes are formed of a continuous partial cylindrical face on a side opposite to said inlet port and a width s of a valve seat step which is a difference between an inside diameter D of each said valve seat hole and an inside diameter d of each said valve seat is $$s \leq 0.03d+3 \text{ [mm]}.$$

3. A fluid selector valve according to claim 1, wherein said valve casing is formed by joining an end block to a main body, said main body includes a flow path extending from said inlet port to communicate with one of said outlet ports through one of said valve seats, a rod passing for sliding through said main body and having at a tip end of said rod a valve body so as to open and close said valve seats with said valve body, and driving means for driving said rod to seat said valve body on both said valve seats, and said end block has said valve seat communicating with the other of said outlet ports and a flow path extending from said valve seat to said outlet port.

4. A fluid selector valve according to claim 2, wherein said valve casing is formed by joining an end block to a main body, said main body includes a flow path extending from said inlet port to communicate with one of said outlet ports through one of said valve seats, a rod passing for sliding through said main body and having at a tip end of said rod a valve body so as to open and close said valve seats with said valve body, and driving means for driving said rod to seat said valve body on both said valve seats, and said end block has said valve seat communicating with the other of said outlet ports and a flow path extending from said valve seat to said outlet port.

5. A fluid selector valve according to claim 3, wherein elbow-shaped bends are formed in said flow paths extending from said two valve seats to communicate with said respective outlet ports and a radius R of curvature of each said bend on an outer peripheral side is $$R = 0.5d \text{ to } 1d.$$

6. A fluid selector valve according to claim 4, wherein elbow-shaped bends are formed in said flow paths extending from said two valve seats to communicate with said respective outlet ports and a radius R of curvature of each said bend on an outer peripheral side is $$R = 0.5d \text{ to } 1d.$$

* * * * *